United States Patent
Nishiyama

[11] Patent Number: 5,898,463
[45] Date of Patent: Apr. 27, 1999

[54] IMAGE DISPLAY APPARATUS

[75] Inventor: Hiroshi Nishiyama, Noda, Japan

[73] Assignee: Victor Company of Japan, Ltd., Yokohama, Japan

[21] Appl. No.: 08/599,995

[22] Filed: Feb. 14, 1996

[30] Foreign Application Priority Data

Feb. 15, 1995 [JP] Japan ..................................... 7-051814

[51] Int. Cl.⁶ .............................. H04N 3/27; H04N 5/46
[52] U.S. Cl. .......................... 348/554; 348/555; 348/556; 348/705; 348/706
[58] Field of Search ..................................... 348/554, 555, 348/556, 558, 705, 706, 503, 504, 443, 455; H04N 3/27, 5/46

[56] References Cited

U.S. PATENT DOCUMENTS

| | | | |
|---|---|---|---|
| 4,414,571 | 11/1983 | Kureha et al. | 348/558 |
| 4,426,661 | 1/1984 | Okada et al. | 348/448 |
| 5,018,013 | 5/1991 | Rabbi | 348/706 |
| 5,041,910 | 8/1991 | Suda et al. | 348/706 |
| 5,132,793 | 7/1992 | Hirahata et al. | 348/556 |
| 5,257,106 | 10/1993 | Maruoka | 348/706 |
| 5,361,099 | 11/1994 | Kim | 348/556 |
| 5,420,641 | 5/1995 | Tsuchida | 348/556 |
| 5,475,442 | 12/1995 | Matsushita et al. | 348/556 |
| 5,663,768 | 9/1997 | Yang | 348/555 |
| 5,703,657 | 12/1997 | Maruoka et al. | 348/554 |

FOREIGN PATENT DOCUMENTS

| | | |
|---|---|---|
| 03035673 | 2/1989 | Japan . |
| 04159865 | 6/1992 | Japan . |
| 08237565 | 9/1996 | Japan . |
| 2245128 | 12/1991 | United Kingdom . |

Primary Examiner—John K. Peng
Assistant Examiner—Linus H. Lo
Attorney, Agent, or Firm—Michael N. Meller

[57] ABSTRACT

The present invention provides an image display apparatus equipped with a common terminal section 10 to which a single-density signal and a double-density signal each having different horizontal scanning frequencies to each other are commonly connected. The single-density and double-density signals are selectively inputted to the single-density signal processing circuit 5 or the double-density signal processing circuit 6 by a switching operation of a switch 11. A synch-signal separation circuit 13 separates a synchronous signal carrying the horizontal scanning frequency from the signal inputted to the common terminal section 10. An fV-conversion circuit 14 converts a horizontal scanning frequency of the synchronous signal into a voltage. A frequency discrimination circuit 15 detects the horizontal scanning frequency and memorize it in a look-up table of a memory device 16. A control circuit 17 controls switching operations of the switches 7, 11 on the basis of the horizontal scanning frequencies of the signals memorized in the look-up table of the memory device 16.

8 Claims, 4 Drawing Sheets

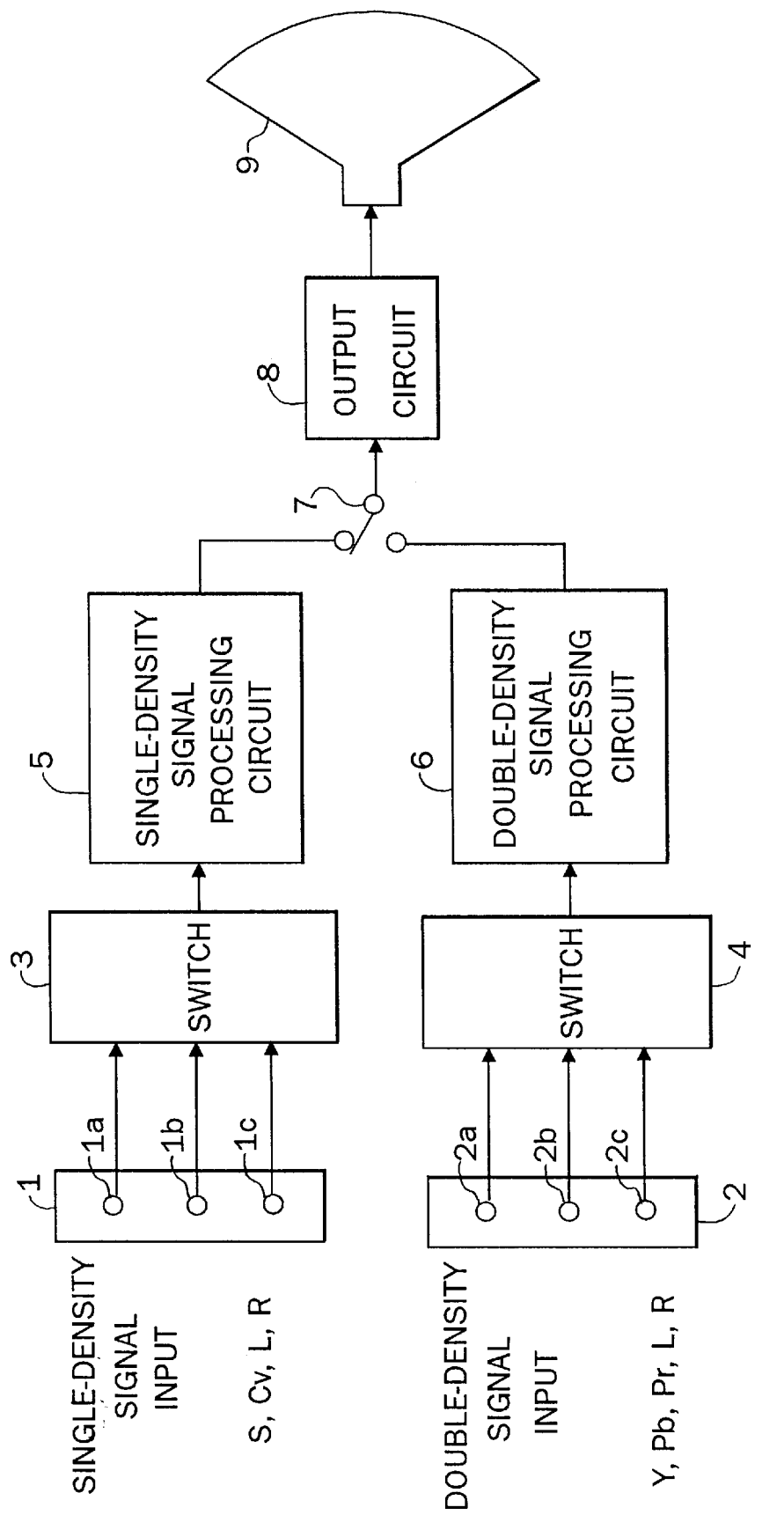

IMAGE DISPLAY APPARATUS

BACKGROUND OF THE INVENTION

1. Field of the Invention

This invention relates to image display apparatuses, and, in particular, relates to an image display apparatus equipped with an input terminal section for inputting at least two kinds of image signals having different horizontal scanning frequencies to each other.

2. Description of the Related Arts

Recently, with the variety of image signals, there appears not only video signals of the conventional NTSC system but also the video signals different from those of the NTSC system such as video signals of the second generation of the EDTV (Enhanced Definition TV) and High Definition TV (HDTV) systems.

The horizontal scanning frequency of the NTSC system is 15.75 kHz and the horizontal scanning frequency fully decoded form in the second generation EDTV is 31.5 kHz and the horizontal scanning frequency of the HDTV is 33.75 kHz. The video signal of the NTSC system is referred to as a single-density signal and the video signals such as those of the second generation EDTV and the HDTV are referred to as a double-density signal hereinafter.

FIG. 1 is a block diagram of a conventional image display apparatus for monitoring input signals, which is capable of displaying both the single-density signal and the double-density signal in the prior art.

In FIG. 1, the numeral 1 denotes an input terminal section (referred to as a single-density terminal section) for inputting the single-density signal composed of three input terminal systems 1a, 1b, 1c. Each of the three input terminal systems 1a, 1b, 1c includes an S-terminal for inputting an S-video signal having a luminance signal and a color signal separated from each other as mentioned hereinafter, a terminal for inputting a composite video signal Cv and a pair of terminals for inputting L (light) and R (right) sound signals.

The numeral 2 denotes a double-density terminal section composed of three input terminal systems 2a, 2b, 2c. Each of the three input terminal systems 2a, 2b, 2c includes a terminal for inputting a luminance signal Y, a terminal for inputting color difference signals Pb, Pr as mentioned hereinafter and a pair of terminals for inputting L (light) and R (right) sound signals.

A plurality of single-density signals inputted to the single-density terminal section 1 through the three input terminal systems 1a, 1b, 1c are inputted to a switch 3, and one of them is selectively inputted to a single-density signal processing circuit 5.

A plurality of double-density signals inputted to the double-density terminal section 2 through the three input terminal systems 2a, 2b, 2c are inputted to a switch 4, and one of them is selectively inputted to a double-density signal processing circuit 6.

When both output signals from the single-density and double-density signal processing circuits 5, 6 are inputted to a switch 7, one of them is selectively outputted therefrom and is inputted to a well known output circuit 8 for displaying an image on a CRT 9. After undergoing various kinds of video signal processings and being amplified by the output circuit 8, the output signal therefrom is inputted to the CRT 9 to display an image thereon. Incidentally, the description of the sound signal processing section is omitted here.

Next, a description is given of the single-density terminal section 1 and the double-density terminal section 2 referring to FIG. 2.

FIG. 2 is a front view showing a terminal section of the image display apparatus of the prior art.

In FIG. 2, the single-density input terminal section 1 includes the three input terminal systems 1a, 1b, 1c, each having the S-terminal (video S), the terminal (video Cv) for inputting the composite video signal Cv and the pair of terminals (sound L, R) for inputting the R, L sound signals.

The double-density input terminal section 2 includes the three input terminal systems 2a, 2b, 2c, each having the terminal (Y) for inputting the luminance signal Y, the terminals (Pb), (Pr) for inputting the color difference signals Pb, Pr, and the pair of terminals (sound L, R) for inputting the sound signals R, L.

In the conventional image display apparatus having both the single-density input terminal section 1 and the double-density input terminal section 2, it is necessary to connect a cable to either the single-density input section 1 or the double-density input terminal section 2 knowing that the signal intended to be inputted is the single-density signal or the double-density signal.

When the cable for the single-density signal is erroneously connected to the double-density input terminal section 2 or when the cable for the double-density signal is erroneously connected to the single-density input terminal section 1, a correct image can not be displayed on the CRT 9. In most cases, pin-plugs based on the RCA standards are employed in all the input terminals for inputting the composite video signals Cv, L, R sound signals, the luminance signal Y, and the color different signals Pb, Pr. Thus, such cable is possible to be connected to either the single-density input terminal section 1 or and the double-density input terminal section 2, resulting in an erroneous connection to a wrong input terminal section.

Further, there are problems of a space and a production cost because it requires two separated input terminal sections 1 and 2.

SUMMARY OF THE INVENTION

Accordingly, a general object of the present invention is to provide an image display apparatus in which the disadvantages mentioned in the foregoing Description of Related Arts have been eliminated.

A more specific object of the present invention is to provide an image display apparatus equipped with a terminal section for inputting at least two kinds of signals carrying different horizontal scanning frequencies to each other, the image display apparatus comprising: output means for displaying an image of signal on display means; a common input terminal section for inputting at least the two kinds of signals having the different horizontal scanning frequencies to each other; signal processing means for processing at least the two kinds of signals, the signal processing means comprising at least two signal processing circuits; switching means for selectively inputting one of the signals coming to the common input terminal section to one of the two signal processing circuits and selectively inputting the signal outputted from the two signal processing circuits to the output means; a synch-signal separation circuit for separating a synchronous signal having a horizontal scanning frequency from one of the signals inputted to the common input terminal section; detecting means for detecting the horizontal scanning frequency of the signal inputted to the common terminal section by using the synchronous signal outputted from the synch-signal separation circuit; and control means for controlling switching operation of the switching means corresponding to the horizontal scanning frequency obtained from the detecting means.

Other objects and further features of the present invention will be apparent from the following detailed description.

BRIEF DESCRIPTION OF THE DRAWINGS

FIG. 1 is a block diagram of a conventional image display apparatus capable of displaying both the single-density signal and the double-density signal in the prior art;

DETAILED DESCRIPTION OF THE PREFERRED EMBODIMENT

A description is now given of an embodiment of an image display apparatus of the present invention referring to FIGS. 3 to 6.

Figure 6:
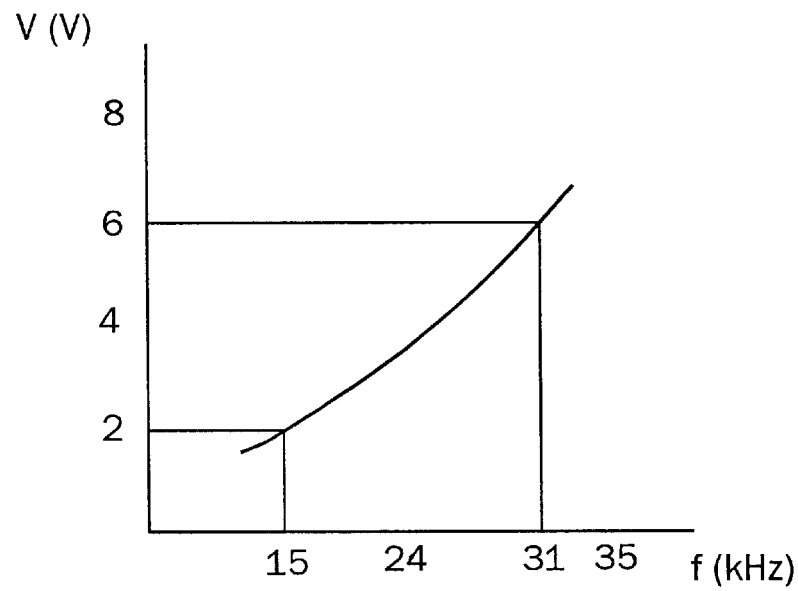
FIG. 6 is a graph for explaining an operation of the fV-conversion circuit shown in FIG. 3.
Figure 2:
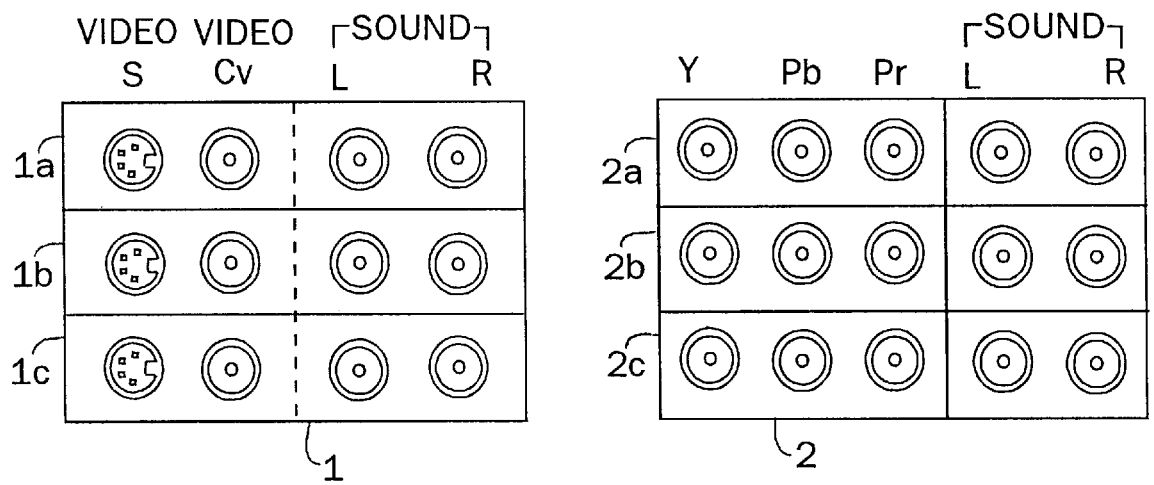
FIG. 2 is a front view showing a terminal section of the image display apparatus of the prior art.
Figure 3:
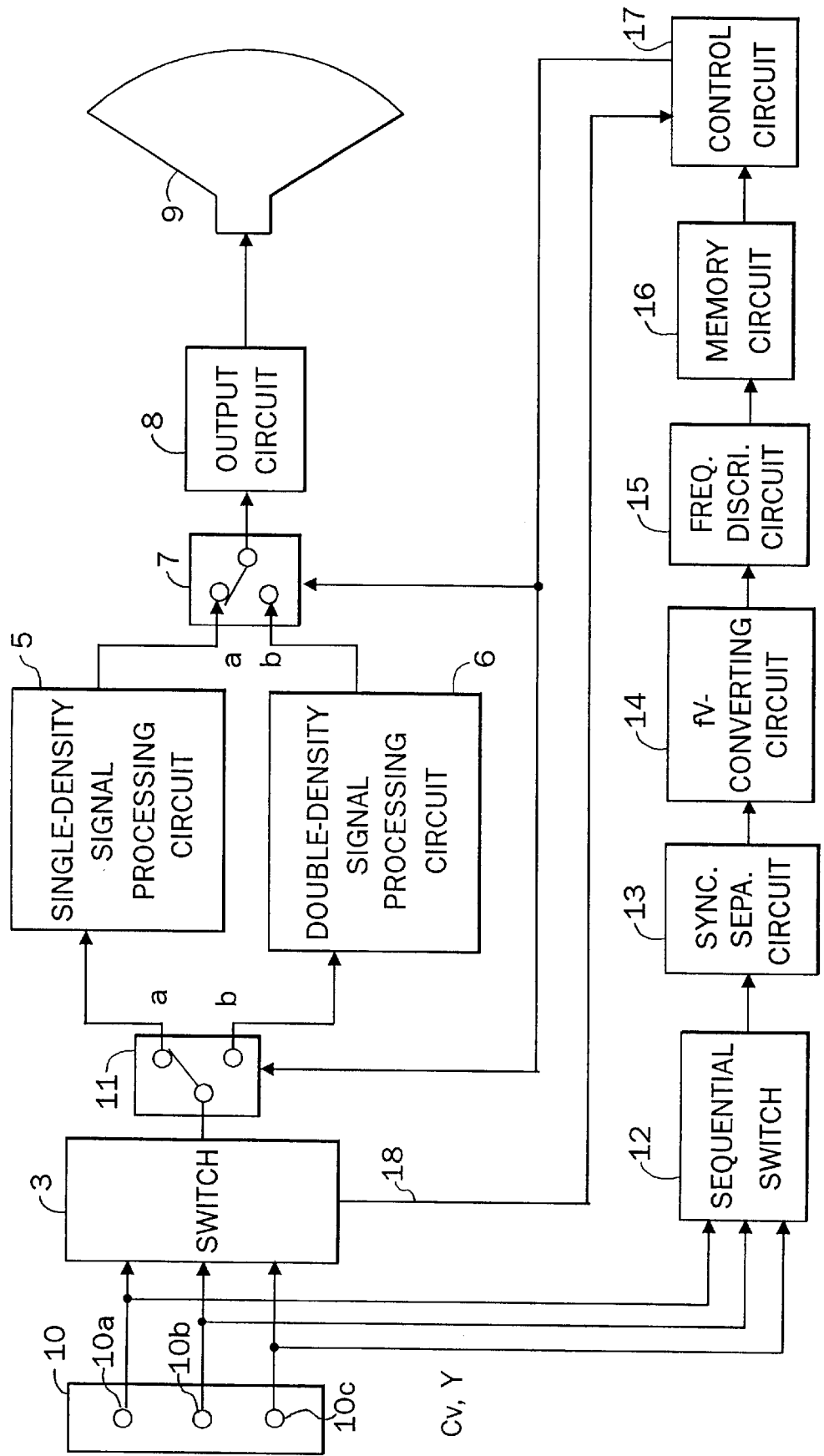
FIG. 3 is a block diagram of an embodiment of an image display apparatus in the present invention.
Figure 4:
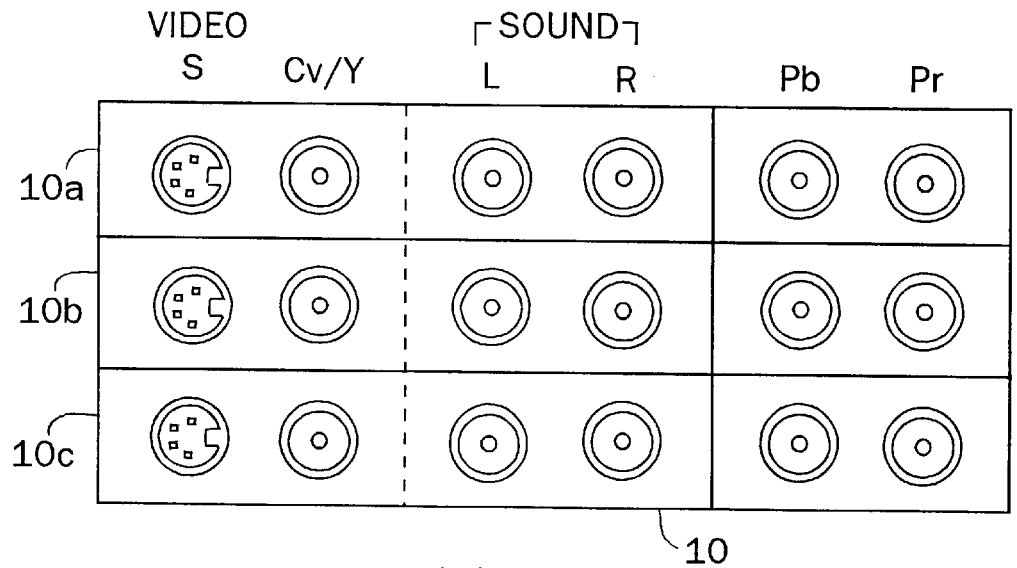
FIG. 4 is a front view showing an embodiment of a common input terminal section of the present invention.
Figure 5A:
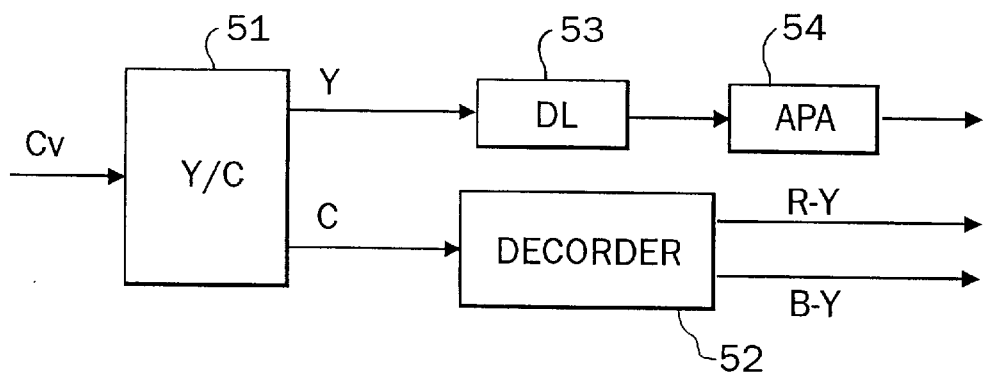
FIG. 5 (A) is a block diagram of a single-density signal processing circuit shown in FIG. 3
FIG. 5(B) is a block diagram of a double-density signal processing circuit shown in FIG. 3.
Figure 5B:
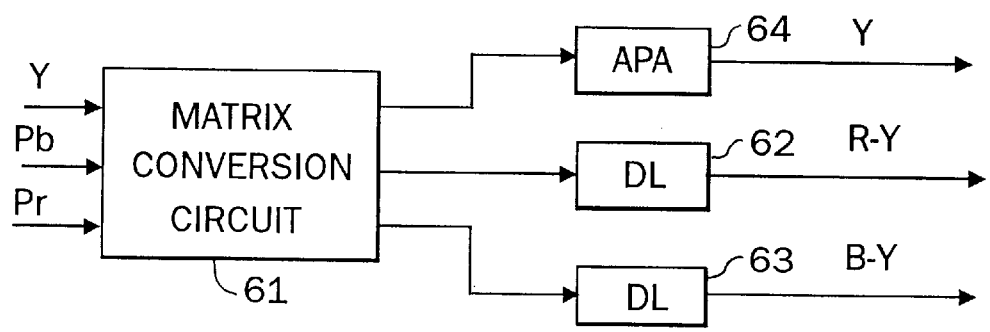

FIG. 3 is a block diagram of an embodiment of an image display apparatus in the present invention, FIG. 4 is a front view showing an embodiment of a common input terminal section of the present invention, FIG. 5 (A) is a block diagram of a single-density signal processing circuit shown in FIG. 3 and FIG. 5(B) is a block diagram of a double-density signal processing circuit shown in FIG. 3, and FIG. 6 is a graph for explaining an operation of the fV-conversion circuit shown in FIG. 3, wherein like parts shown in FIGS. 1 and 2 are denoted with the same reference characters as those of FIGS. 1 and 2.

Referring to FIG. 3, a common input terminal section (referred to as a terminal section hereinafter) 10 for the single-density signal and the double-density signal is composed of three input terminal systems 10a, 10b and 10c. Each of the three input terminal systems 10a, 10b, 10c has an S-terminal (video S) for inputting the S-video signal, a terminal (Cv/Y) for inputting the composite video signal Cv or the luminance signal Y, the pair of terminals (sound L, R) for inputting the L,R sound signals and the terminals (Pb, Pr) for inputting color difference signals Pb, Pr as mentioned hereinafter.

The single-density and/or double-density signals coming to the terminal section 10 are inputted to the switch 3, and desired one of them to be monitored is selected by a user as an input terminal system selection. The output signal from the switch 3 is selectively inputted to the single-density signal processing circuit 5 or the double-density signal processing circuit 6 through a switch 11. And a user's input terminal system selection is known to a control circuit 17 through a line 18. The output signal from the single-density signal processing circuit 5 or the double-density signal processing circuit 6 is inputted to the switch 7, and is selectively outputted therefrom. The output signal from the switch 7 is inputted to the well known output circuit 8 for displaying an image on the CRT 9. After undergoing various kinds of video signal processings and being amplified by the output circuit 8, the output signal therefrom is inputted to the CRT 9 to display an image thereon. Incidentally, the switches 7 and 11 are controlled so as to connect the single-density signal to a terminal "a" and so as to connect the double-density signal to a terminal "b" by the control circuit 17.

As shown in FIG. 5 (A), wherein it is shown an embodiment of the single-density signal processing circuit 5, the single-density signal processing circuit 5 is composed of a Y/C separation circuit 51 for separating the luminance signal Y and the color signal C from the composite video signal Cv, a decoder 52 for generating a color difference signals R-Y and B-Y from the color signal C, a delay circuit 53, and an aperture circuit 54. Thereby, the single-density signal is demodulated to be outputted.

As shown in FIG. 5 (B), wherein there is shown an embodiment of the double-density signal processing circuit 6, the double-density signal processing circuit 6 is composed of a matrix conversion circuit 61 for generating the luminance signal Y and the color difference signals R-Y, B-Y from the luminance signal Y and the color difference signals Pb, Pr, delay circuits 62, 63 and an aperture circuit 64. Thereby, the double-density signal is demodulated to be outputted.

Incidentally, the description of the processing of the sound signals is omitted here.

On the other hand, among the single-density signals and/or the double-density signals inputted to the terminal section 10, the composite video signal Cv of the single-density signal and the luminance signal Y of the double-density signal are inputted to a sequential switch 12. The sequential switch 12 selects one of the three terminal systems 10a, 10b, 10c by performing a switching operation at a constant time interval. The single-density signal or the double-density signal outputted from the sequential switch 12 is inputted to a synch-signal separation circuit 13, so that a synchronous signal is separated from the composite video signal Cv of the single-density signal or the luminance signal Y of the double-density signal. The synchronous signal mentioned above is inputted to an fV-conversion circuit 14, and the synchronous signal carrying a horizontal scanning frequency is converted into a value of a voltage corresponding to the horizontal scanning frequency thereof by the fV-conversion circuit 14.

FIG. 6 shows an exemplary relation between the horizontal scanning frequency and a voltage converted corresponding to the horizontal scanning frequency by the fV-conversion circuit 14.

The output signal from the fV-conversion circuit 14 is inputted to a frequency discrimination circuit 15. In the frequency discrimination circuit 15, preset values of voltages are preliminarily stored for every horizontal scanning frequency. Thus, the frequency discrimination circuit 15 detects the inputted horizontal scanning frequency by comparing the value of the voltage thereof with the preset values of the voltage. In other words, the fV-conversion circuit 14 and the frequency discrimination circuit 15 form detecting device for detecting the horizontal scanning frequency from the signals inputted from the terminal section 10. The detected horizontal scanning frequency is inputted to a memory device 16 for memorizing the discriminated result.

As mentioned in the foregoing, the sequential switch 12 switches the three terminal systems 10a, 10b, 10c at a constant time interval. Thus, it is possible to memorize all the kinds of the horizontal scanning frequencies inputted in relation to the three terminal systems 10a, 10b, 10c in the memory device 16 which is used as a status memory.

An example of a content of the memory device 16 is shown in Table 1 as a look-up table.

TABLE 1

| | input 10c, D2 | input 10b, D1 | input 10a, D0 | statuses |
|---|---|---|---|---|
| 0 | 0 | 0 | 0 | all single-density signals |
| 1 | 0 | 0 | 1 | 10a: *doub., others: **sin. |
| 2 | 0 | 1 | 0 | 10b: doub., others: sin. |
| 3 | 0 | 1 | 1 | 10a, 10b: doub., 10c: sin. |
| 4 | 1 | 0 | 0 | 10c: doub., others: sin. |
| 5 | 1 | 0 | 1 | 10a, 10c: doub., 10b: sin. |
| 6 | 1 | 1 | 0 | 10b, 10c: doub., 10a: sin. |
| 7 | 1 | 1 | 1 | all double-density signals |

*double-density signal
**single-density signal

In Table 1, the kinds of the input signals coming to the three terminal systems 10a, 10b, 10c are respectively expressed with a binary digit form (D0, D1, D2), wherein the single-density signal is expressed with "0" and the double-density signal "1".

The signals corresponding to the signal statuses in relation to the input terminal systems are outputted to the control circuit 17, which controls the switches 7 and 11 according to the user's input terminal system selection and the memorized signal statuses, i.e., the single-density signal or the double-density signal. The frequency discrimination circuit 15, the memory device 16 and the control circuit 17 are possible to be constructed by using a microcomputer.

Next, a description is given to the input terminal section 10 referring to FIG. 4.

In FIG. 4, the input terminal section 10 includes the three input terminal systems 10a, 10b, 10c, each having the S-terminal (video S), the terminal (Cv/Y) for inputting the composite video signal Cv or the luminance signal Y, the pair of terminals (sound L, R) for inputting the R, L sound signals and the terminal (Pb, Pr) for inputting the color difference signals Pb, Pr.

Specifically, the composite video signal Cv of the single-density signal and the luminance signal Y of the double-density signal are inputted to the common terminal (Cv/Y), and the L, R sound signals of both the single-density signal and the double-density signal are inputted to a pair of common terminals (L, R sound). The reason why the composite video signal Cv of the single-density signal and the luminance signal Y of the double-density signal are inputted to the common terminal (Cv/Y) is that each of the composite video signal Cv and the luminance signal Y thereof contains a synchronous signal carrying a horizontal scanning frequency, which is to be separated by the synch-signal separation circuit 13.

In the image display apparatus constructed in such a manner as mentioned above, upon switching the input signal by a user, a horizontal scanning frequency is read out corresponding to the input signal coming to the terminals 10a–10b of the input terminal section 10 referring to the signal statuses in the memory device 16, and the switches 7 and 11 are switched corresponding to the discriminated horizontal scanning frequency read out. Whereby, the single-density and double-density signals are respectively processed in the single-density and double-density signal processing circuits 5 and 6.

In this embodiment, the description is given of a case where the two kinds of signals having different horizontal scanning frequencies to each other are employed, however, it is possible to automatically control more than 2 kinds of signals having different horizontal scanning frequencies between them in the same manner as mentioned in the foregoing if desired.

In that case, additional input processing circuits may be provided parallel to the single-density and double-density frequency signal processing circuits 5 and 6 as necessary.

According to the image display apparatus of the present invention, it does not require a plurality of independent terminal sections corresponding to a plurality of signals having different scanning frequencies. This facilitates the connection of the signals to be inputted to the apparatus and enables to reduce the number of the input terminals, resulting in contributing to reductions of the space and production cost of the image display apparatus.

While the presently preferred embodiments of the present invention have been shown and described, it is to be understood that these disclosures are for the purpose of explanation and that various changes and modifications may be made without departing from the scope of the invention as set forth in the appended claim.

What is claimed is:

1. An image display apparatus equipped with a terminal section for inputting at least two kinds of signals carrying different horizontal scanning frequencies to each other, the image display apparatus comprising:

output means for displaying an image of signal on display means:

a common input terminal section (10) composed of plural sets of terminals (10a–10c) for inputting at least the two kinds of signals having the different horizontal scanning frequencies to each other;

signal processing means (5, 6) for processing at least the two kinds of signals, the signal processing means comprising at least two signal processing circuits;

first switching means (3) for selectively inputting one of the signals coming to the common input terminal section (10);

second switching means (11) for selectively inputting an output signal from the first switching means (3) to one of the two signal processing circuits;

third switching means (7) for selectively inputting a signal outputted from one of the two signal processing circuits to the output means (8);

sequential switch (12) for selectively outputting one of the plural signals from the plural sets of terminals at a predetermined interval by sequentially switching the plural sets of terminals of the common input terminal section;

a synch-signal separation circuit (13) for separating a synchronous signal having a horizontal scanning frequency from one of the signals outputted from the sequential switch (12) of the common input terminal section (10);

detecting means (14, 15) for detecting the horizontal scanning frequency of the signal inputted to the common terminal section by using the synchronous signal outputted from the synch-signal separation circuit;

memory means (16) for storing a result detected by the detecting means, and control means (17) for controlling switching operation of the second and third switching means corresponding to the horizontal scanning frequency obtained from the detecting means.

2. An image display apparatus as claimed in claim 1, further comprises an fV converting circuit for converting the synchronous signal carrying the horizontal scanning frequency into a value of a voltage corresponding to the horizontal scanning frequency thereof.

3. An image display apparatus equipped with a terminal section for inputting at least two kinds of signals carrying different horizontal scanning frequencies to each other, the image display apparatus comprising:

output means for displaying an image of signal on display means;

a common input terminal section for inputting at least the two kinds of signals having the different horizontal scanning frequencies to each other, the common input terminal section comprising a first common terminal (Cv/Y) for inputting one signal selected from a group of signals consisting of a composite video signal and luminance signal, a second common terminal (L, R) for inputting sound signals and a third terminal (Pb, Pr) for inputting a color difference signal;

signal processing means (5, 6) for processing at least the two kinds of signals, the signal processing means comprising at least two signal processing circuits;

switching means (11, 17) for selectively inputting one of the signals coming to the common input terminal section to one of the two signal processing circuits and selectively inputting the signal outputted from the two signal processing circuits to the output means;

a synch-signal separation circuit (13) for separating a synchronous signal having a horizontal scanning frequency from one of the signals inputted to the common input terminal section;

detecting means (14, 15) for detecting the horizontal scanning frequency of the signal inputted to the common terminal section by using the synchronous signal outputted from the synch-signal separation circuit; and control means (17) for controlling switching operation of the switching means corresponding to the horizontal scanning frequency obtained from the detecting means.

4. An image display apparatus as claimed in claim 3, wherein the common input terminal further comprising a fourth terminal for a separate "S" terminal.

5. An image display apparatus as claimed in claim 3, further comprising an fv-converting circuit for converting the synchronous signal carrying the horizontal scanning frequency into a value having a specified voltage corresponding to the horizontal scanning frequency thereof.

6. An image display apparatus as claimed in claim 3, wherein the control means further comprises a memory circuit for memorizing the results of the detecting means.

7. An image display apparatus as claimed in claim 5, wherein the common input terminal section includes a plurality of terminal systems.

8. An image display apparatus as claimed in claim 7, further comprising a sequential switch for selecting one of the plurality of terminal systems by performing a switching operation at a constant time interval.

* * * * *